United States Patent
Walton et al.

(10) Patent No.: US 9,645,857 B2
(45) Date of Patent: May 9, 2017

(54) RESOURCE FAULT MANAGEMENT FOR PARTITIONS

(75) Inventors: Andrew C. Walton, Rocklin, CA (US); Jeffrey A. Barlow, Wilton Manors, FL (US); Howard Calkin, Davis, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 2186 days.

(21) Appl. No.: 12/641,001

(22) Filed: Dec. 17, 2009

(65) Prior Publication Data

US 2011/0154349 A1     Jun. 23, 2011

(51) Int. Cl.
| | |
|---|---|
| G06F 9/00 | (2006.01) |
| G06F 9/50 | (2006.01) |
| G06F 9/44 | (2006.01) |
| G06F 9/22 | (2006.01) |

(52) U.S. Cl.
CPC ............ G06F 9/5061 (2013.01); G06F 9/22 (2013.01); G06F 9/44 (2013.01)

(58) Field of Classification Search
None
See application file for complete search history.

(56) References Cited

U.S. PATENT DOCUMENTS

| | | | |
|---|---|---|---|
| 7,069,473 B2* | 6/2006 | Yasuda | 714/37 |
| 7,765,428 B2* | 7/2010 | Armstrong et al. | 714/10 |
| 7,788,665 B2* | 8/2010 | Oshins | 718/1 |
| 8,288,574 B2* | 10/2012 | Boensch et al. | 554/169 |
| 2003/0070114 A1* | 4/2003 | Yasuda | 714/20 |
| 2007/0028244 A1* | 2/2007 | Landis et al. | 718/108 |
| 2007/0174361 A1* | 7/2007 | Branda et al. | 707/204 |
| 2007/0204265 A1* | 8/2007 | Oshins | 718/1 |
| 2008/0028415 A1* | 1/2008 | Binns et al. | 718/107 |
| 2009/0037367 A1* | 2/2009 | Wein | 707/2 |
| 2009/0083575 A1* | 3/2009 | Armstrong et al. | 714/13 |

* cited by examiner

*Primary Examiner* — John Hayes
*Assistant Examiner* — Tim Hale
(74) *Attorney, Agent, or Firm* — Conley Rose, P.C.

(57) ABSTRACT

In accordance with at least some embodiments, a system includes a plurality of partitions, each partition having its own operating system (OS) and workload. The system also includes a plurality of resources assignable to the plurality of partitions. The system also includes management logic coupled to the plurality of partitions and the plurality of resources. The management logic is configured to set priority rules for each of the plurality of partitions based on user input. The management logic performs automated resource fault management for the resources assigned to the plurality of partitions based on the priority rules.

8 Claims, 3 Drawing Sheets

RESOURCE FAULT MANAGEMENT FOR PARTITIONS

BACKGROUND

As computer system processing capacity increases, partitionable computer systems have emerged as a desirable solution providing flexibility and security. In a partitionable computer system, the computer's resources are "carved" into a plurality of environments, each isolated from the others. Each partition, for example, may be configured to support a particular operating system and applications supported by the operating system. By dividing the computer's resources into a plurality of partitions, a greater degree of flexibility is attained since different operating systems and applications can operate on different partitions. At the same time, each partition is protected in the event that another partition is corrupted or fails. The isolation between partitions which results in flexibility and ensures robust security, however, makes resource fault management between the partitions difficult.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
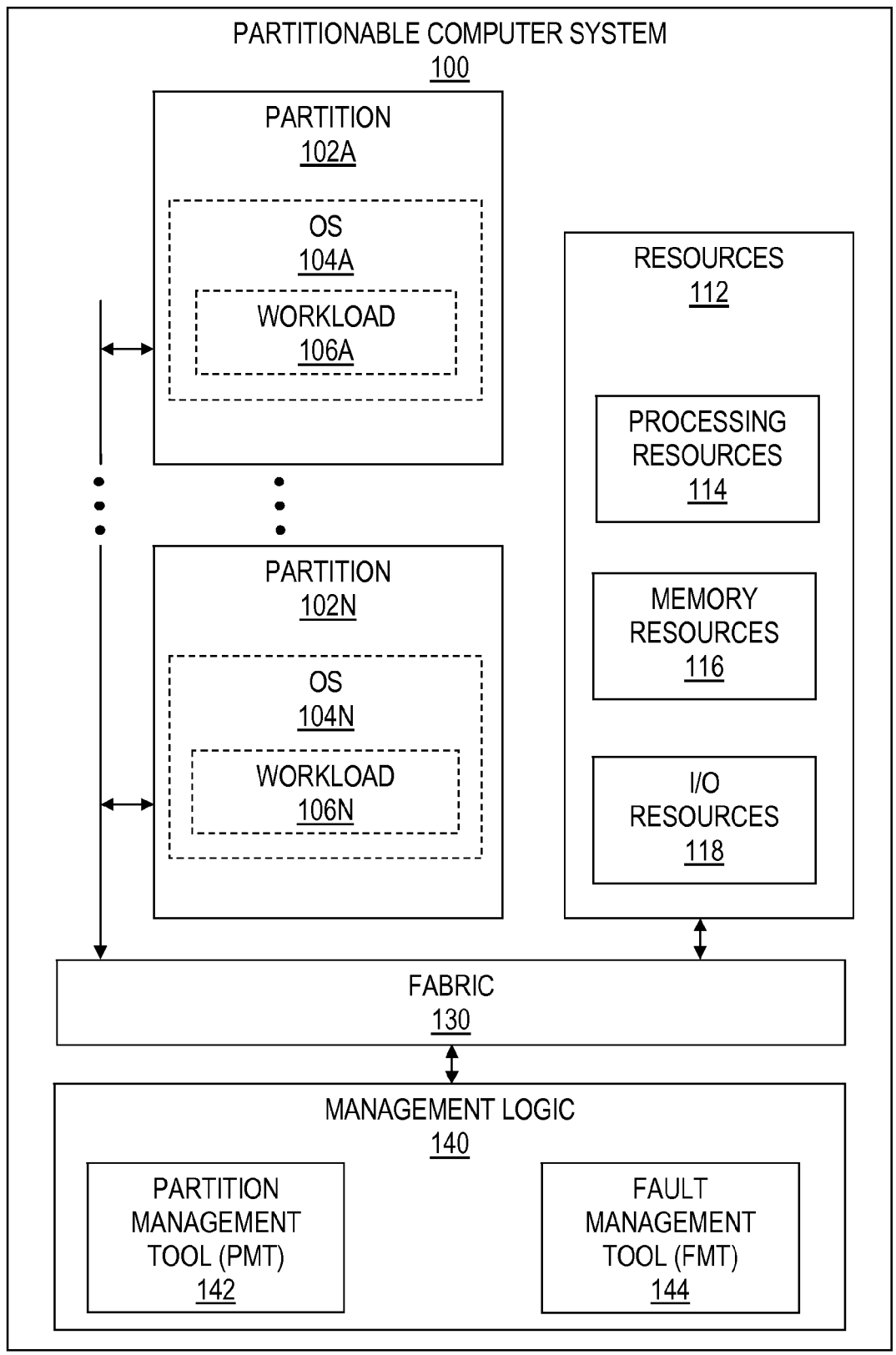
FIG. 1 illustrates a partitionable computer system in accordance with an embodiment of the disclosure.

FIG. 1 illustrates a partitionable computer system 100 in accordance with an embodiment of the disclosure. As shown in FIG. 1, the partitionable computer system 100 comprises a plurality of partitions 102A-102N, each having its own operating system (OS) 104A-104N and workload 106A-106N. Each of the workloads 106A-106N may correspond to one or more applications executed on a particular OS using a portion of resources 112, which may correspond to processing resources 114, memory resources 116 and input/output (I/O) resources (e.g., ports) 118. In some embodiments, the partitionable computer system 100 is able to execute applications for different OSes by maintaining at least one partition for each OS.

In FIG. 1, the partitions 102A-102N are accessible to the resources 112 and to management logic 140 via a fabric 130. The fabric 130 comprises configurable hardware (e.g., switches and other interconnection logic) to selectively associate the resources 112 with different partitions and to selectively interconnect the resources 112 for use by different partitions. For example, the fabric 130 may connect the resources 112 in a manner that presents a coherent memory image for each OS. In accordance with at least some embodiments, the number of partitions and the resources 112 assigned to each partition is controlled by the management logic 140. Further, the management logic 140 may control fault management for the partitionable computer system 100. For example, in FIG. 1, the management logic 140 comprises a partition management tool (PMT) 142 to manage partitions and a fault management tool (FMT) 144 to manage resource faults. In accordance with at least some embodiments, the management logic 140 comprises at least one management processor and the PMT 142 and the FMT 144 comprise firmware executed by the management processor(s) to provide the management logic 140 some or all of the functionality described herein as attributed to the management logic 140.

In FIG. 1, the partitions 102A-102N correspond to logical divisions. In other words, the partitions 102A-102N and the partitionable computer system 100 are not limited to any particular physical embodiment. In one embodiment, the partitionable computer system 100 may correspond to a server computer enclosure configured to organize the partitions 102A-102N. In this embodiment, the server computer enclosure comprises processing resources, memory resources, partition software, and the management logic 140 to organize the logical partitions 102A-102N; however, the resources 112 that enable each partition to operate on a workload are provided by hardware separate from the server computer enclosure. For example, the resources 112 may correspond to a plurality of "blades." In some embodiments, each blade comprises processing resources 114, memory resources 116 and I/O resources 118. Further, each of the partitions 102A-102N is assigned at least one blade. In other words, resources 112 are assigned at a per-blade level. In alternative embodiments, resources 112 may be selectively assigned at smaller levels or greater levels than a per-blade level. Further, in some embodiments, not all blades have the same amount of processing resources 114, memory resources 116 and I/O resources 118. Further, each blade may have its own enclosure. Alternatively, multiple blades may be housed together in a multi-blade enclosure. In some embodiment, all components of the paritionable computer system 100, including the resources 112 (e.g., blades) are housed within a single chassis. Further, in alternative embodiments, the partitions 102A-102N may be virtualized as is understood in the art.

In at least some embodiments, the partition features (e.g., quantity, OS, workload, resources allocated) for the partitionable computer system 100 are based on a default configuration provided by a manufacturer of the partitionable computer system 100. Alternatively, the partition features of the partitionable computer system 100 are based on a customized configuration provided by a manufacturer for a customer. In either case, in accordance with some embodiments, a user is able to update the partition features of the partitionable computer system 100 via a user interface integrated with the operation of the management logic 140. The same user interface also may be implemented to set/update partition priority rules based on user input and to broadcast fault management messages to a user of the partitionable computer system 100.

In accordance with at least some embodiments, the management logic 140 enables automated handling of resource failures by reassigning healthy resources to high priority workloads to replace resources that have failed, are temporarily unavailable, or have experienced a pattern of correctable errors (indicating either a performance degradation or liability for a future crash). If possible, the management logic 140 implements "online" resource adjustments (e.g., resource additions and/or resource deletions) to handle resource failures. With "online" resource adjustments, partition resources are selectively adjusted without rebooting the affected partitions. As an example, resources may be removed from a first partition and then allocated to a second partition without rebooting either partition. In the event that a resource fault causes a partition to crash, an online resource adjustment technique may still be implemented to re-establish the crashed partition. For example, resources may be removed from an online partition and then allocated to another partition that is being re-established after a crash. Such removal of resources may simply reduce the capacity of the online partition without affecting its online status. Alternatively, the removal of resource may leave the online partition with insufficient resources to operate. In such case, the online partition is shut-down or goes "offline" until resources become available.

Since the management logic 140 supports dynamic adjustment of resources between partitions, some embodiments employ priority rules to determine how the resources of different partitions should be handled in the event of a resource fault. In some embodiments, a default set of priority rules are provided with the PMT 142. Additionally or alternatively, the priority rules may be set and/or adjusted by a user via a user interface associated with the PMT 142. Thereafter, the management logic 140 performs automated resource fault management for the resources assigned to the plurality of partitions based on the priority rules.

As an example, the priority rules may indicate the relative priority of the partitions 102A-102N. To indicate the relative priority of partitions, the priority rules may designate first-level partitions, from which resources cannot be unassigned, and second-level partitions, from which resources can be unassigned. For second-level partitions (individually or in combination), the priority rules may designate a first resource type (e.g., memory resources 116) that can be unassigned and a second resource type (e.g., processing resources 114) that cannot be unassigned. For second-level partitions (individually or in combination), the priority rules may also designate a resource quantity that can be unassigned. For the second-level partitions (individually or in combination), the priority rules may also designate whether a partition workload can be shut down. Additional priority levels and rules can be established with the PMT 142 to achieve a desired fault management behavior.

In at least some embodiments, the priority rules allow priority update events. As used herein, priority update events trigger implementation of a new or updated set of priority rules. In some cases, priority update events may be cyclical. For example, a partition running a payroll application may normally be a low priority workload except on payday when it becomes a high priority workload. In this example, each cyclical payday date corresponds to a priority update event that changes the priority rules temporarily. Further, in at least some embodiments, customers might change priorities of partitions based on changing business objectives. The interface to the partitioning tool may be scriptable, for example, so that customers can change priorities as their business objectives change. If desired, server owners could charge their customers additional money to make their workload a higher priority.

During operation of the partitionable computer system 100, a resource failure may occur. In such case, the management logic 140 is able to detect the failure. More specifically, the FMT 144 may be configured to detect resource failures. In response to a failure, the FMT 144 analyzes the failure. In accordance with at least some embodiments, the FMT 144 gathers information regarding the failure and attempts to identify the smallest piece of hardware that caused the failure. The FMT 144 also may determine the severity of the failure. For example, some "soft" failures may be fixed by rebooting the partition and re-assigning its resources, including the resource that previously failed. Meanwhile, some "hard" failures require replacement or temporary removal of the failed resource from the partitionable computer system 100. If possible, the FMT 144 also determines the cause of the failure (not just the affected hardware and the severity).

Once the FMT 144 has determined the smallest piece of hardware that caused the failure, the FMT 144 transmits a corresponding message to the PMT 142. The FMT 144 also may transmit a message to a user interface to notify the user or administrator regarding the failed hardware. In some embodiments, the FMT 144 transmits a message regarding the failed hardware to a customer care center to enable a manufacturer to respond to the failure.

With the information provided by the FMT 144 and with the priority rules, the PMT 142 is able to determine how to respond to the failure. In at least some embodiments, the PMT 142 deletes the failed resources from its corresponding partition and determines if the loss of resources can be compensated by taking resources from a lower priority partition. If so, the PMT 142 removes resources from a lower priority partition and re-assigns the resources to the higher priority partition. If possible, the PMT 142 performs online removal of resources from the lower priority partition and online addition of those resources to the higher priority partition. If necessary, the PMT 142 may shut-down a lower priority partition completely (e.g., if there are insufficient resources to operate the workload of the lower priority partition).

In cases where a high priority partition crashes due to resource failure, the PMT 142 will receive information from the FMT 144 regarding the failed hardware as described previously. Before or during the reboot of the crashed high priority partition, the PMT 142 removes resources from a lower priority partition and adds the resources to the high priority partition so that the high priority partition can continue operations as soon as possible.

Figure 2:
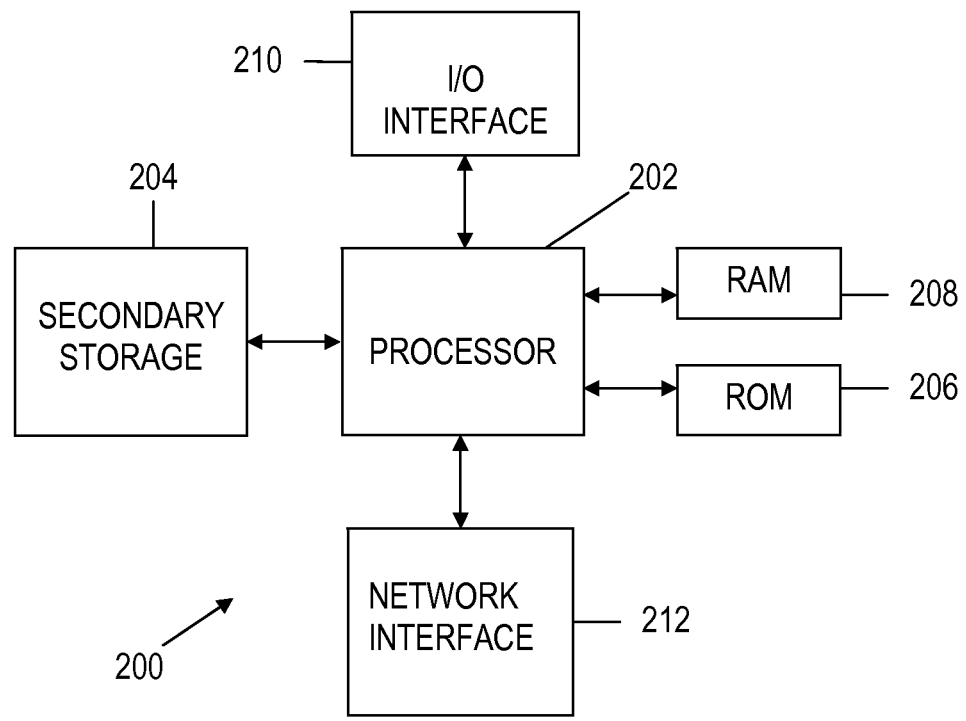
FIG. 2 illustrates a computer system in accordance with an embodiment of the disclosure.

Without limitation to other embodiments, the partition management and fault management technique described for FIG. 1 may be implemented on a general-purpose computer or server. FIG. 2 illustrates a computer system 200 in accordance with embodiments. The computer system 200 includes a processor 202. It should be appreciated that processor 202 may be at least one of a variety of processors such as, for example, a microprocessor, a microcontroller, a central processor unit (CPU), a main processing unit (MPU), a digital signal processor (DSP), an advanced reduced instruction set computing (RISC) machine, an (ARM) processor, etc. The processor 202 executes coded instructions which may be present in a main memory of the processor 202 (e.g., within random-access memory (RAM) 208) and/or within an on-board memory of the processor 202. RAM 208 may be correspond to dynamic RAM (DRAM), synchronous dynamic RAM (SDRAM), and/or any other type of RAM device. The processor 202 also communicates with a secondary storage 204 and a read-only memory (ROM) 206 as needed.

To facilitate communication with other devices the processor 202 couples to an input/output (I/O) interface 210 and a network interface 212. As an example, the I/O interface 210 can be used to interface with devices such as a keyboard, a touchpad, buttons, a keypad, switches, dials, a mouse, a track-ball, a card reader, a liquid crystal display (LCD), a printer, a touch screen display, a light-emitting diode (LED), or other devices. Meanwhile, the network interface 212 may support medium access controller (MAC) layer functions and physical (PHY) layer functions. The network interface 212 supports wired and/or wireless communications.

The secondary storage 204 is typically comprised of one or more disk drives or tape drives and is used for non-volatile storage of data and as an over-flow data storage device if RAM 208 is not large enough to hold all working data. Secondary storage 204 may be used to store programs that are loaded into RAM 208 when such programs are selected for execution. The ROM 206 is used to store instructions and perhaps data that are read during program execution. ROM 206 is a non-volatile memory device that typically has a small memory capacity relative to the larger memory capacity of secondary storage 204. The RAM 208 is used to store volatile data and perhaps to store instructions. Access to both ROM 206 and RAM 208 is typically faster than to secondary storage 204.

In accordance with some embodiments, the computer system 200 implements the partition management and fault management technique described for FIG. 1 by executing partition management software (e.g., the PMT 142 and the FMT 144) stored on a computer-readable storage medium. The computer-readable storage medium may correspond to volatile memory (e.g., RAM 208), non-volatile memory (e.g., ROM 208, secondary storage 204), or both. In such embodiments, execution of the partition management software causes the processor 202 to selectively authenticate a partition manager (e.g., the user of the partitionable computer system 100). Authentication techniques may include, but are not limited to, username entry, password entry, cryptographic keys and/or biometrics. Upon successful authentication, the partition management software enables the partition manager to input priority rules for a plurality of partitions. As needed, execution of the partition management software enables automated resource fault management for resources assigned to the plurality of partitions based on the priority rules. Examples of various priority rules were given previously for FIG. 1.

In at least some embodiments, execution of the partition management software further causes the processor 202 to selectively re-assign resources between two on-line partitions based on the priority rules. Execution of the partition management software may further cause the processor 202 to selectively re-assign resources from an on-line partition to a crashed partition based on the priority rules.

In some embodiments, execution of the partition management software further causes the processor 202 to differentiate, based on the priority rules, between partitions from which resources cannot be unassigned and partitions from which resources can be unassigned. Execution of the partition management software may further causes the processor 202 to designate, based on the priority rules, a resource type and a resource quantity that can be unassigned from at least one of the partitions. In at least some embodiments, execution of the partition management software may further cause the processor 202 to update (at least temporarily) the priority rules based on priority update events.

Figure 3:
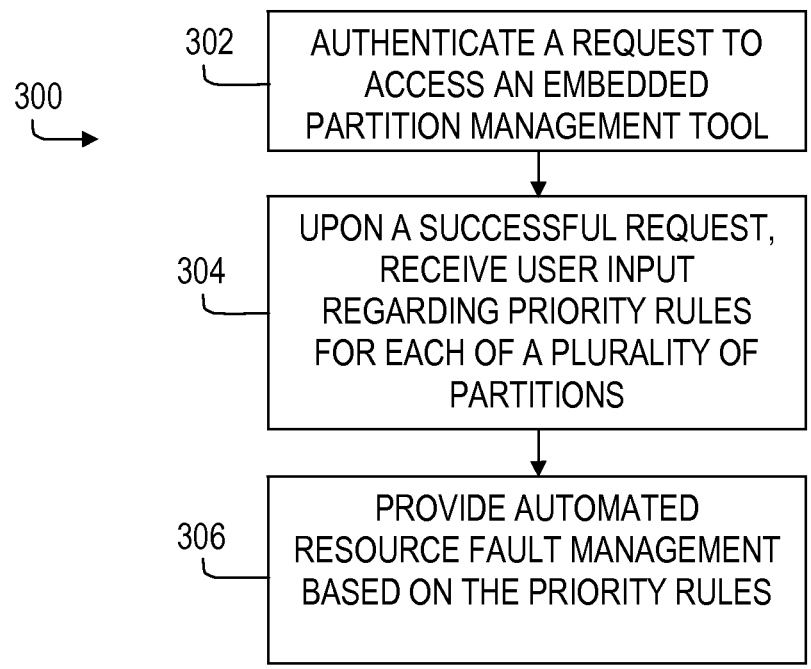
FIG. 3 illustrates a method for configuring resource fault management for partitions in accordance with an embodiment of the disclosure.

FIG. 3 illustrates a method 300 for configuring resource fault management for partitions in accordance with an embodiment of the disclosure. As shown in FIG. 3, the method 300 comprises authenticating a request to access an embedded partition management tool (block 302). In some embodiments, the embedded partition management tool corresponds to firmware of a management processor. Upon a successful request, user input is received regarding priority rules for each of a plurality of partitions (block 304). At block 306, automated resource fault management is provided based on the priority rules.

In some embodiments, the method 300 may comprise additional steps that are added individually or in combination. For example, in some embodiments, the method 300 may additionally comprise selectively re-assigning resources between two on-line partitions based on the priority rules. The method 300 may additionally comprise selectively re-assigning resources from an on-line partition to a crashed partition based on the priority rules. In other words, the crashed partition is able to be re-booted and returns to an operational state using resources taken from another partition. The method 300 may additionally comprise selecting, for each partition, resource assignability (i.e., whether any resources are assignable), resource type assignability (i.e., which resource types are assignable), and resource quantity assignability (i.e., how much of each resource type is assignable). The method 300 may additionally comprise updating the priority rules based on priority update events. In various embodiments, the method 300 may be performed by a processor that executes partition management software as described for FIG. 2. As a specific example, the method 300 may be performed by a management processor that executes the PMT 142 and the FMT 144 described for FIG. 1.

Figure 4:
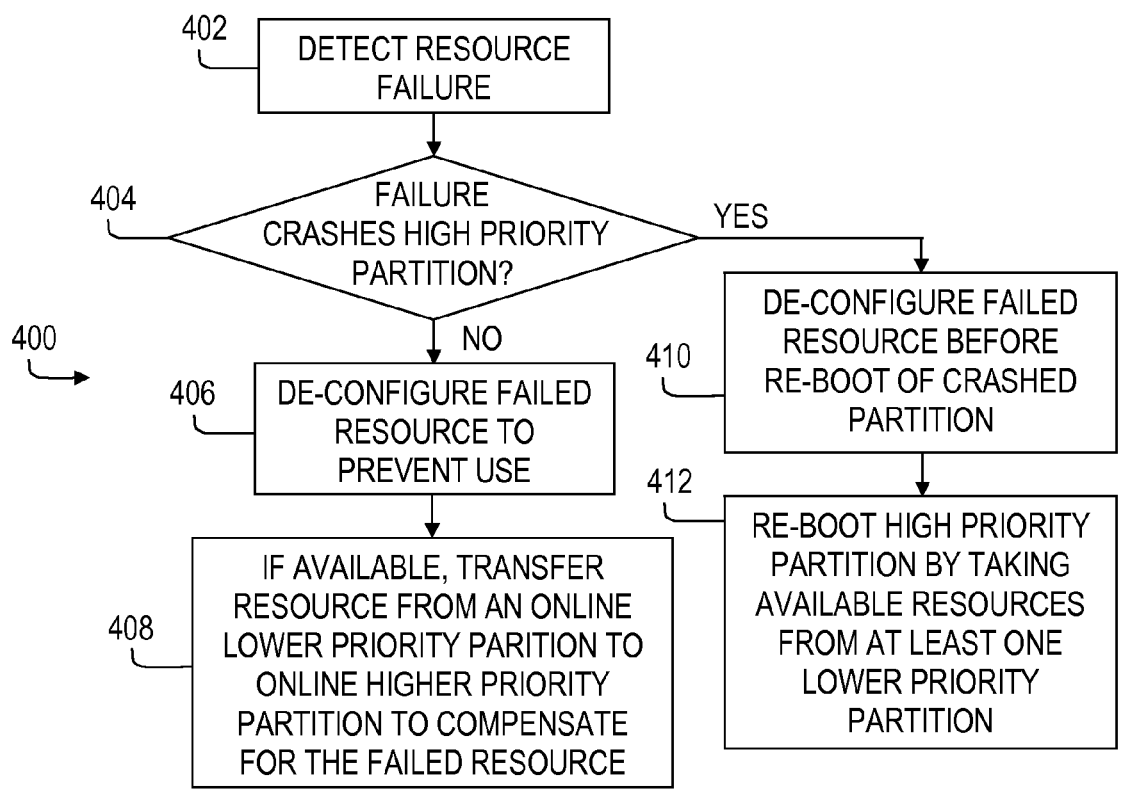
FIG. 4 illustrates a method for providing resource fault management for partitions in accordance with an embodiment of the disclosure.

FIG. 4 illustrates a method 400 for providing resource fault management for partitions in accordance with an embodiment of the disclosure. As shown, the method 400 comprises detecting a resource failure (block 402). If the failure does not crash a high priority partition (determination block 404), the failed resource is de-configured to prevent its use (block 406). If available, resources from an online lower priority partition are re-assigned to an online higher priority partition to compensate for the failed resource (block 408). If the failure does crash a high priority partition (determination block 404), the failed resource is de-configured before the re-boot of the crashed partition (block 410). At block 412, the high priority partition is re-booted by taking available resources from at least one lower priority partition. In various embodiments, the method 400 may be performed by the PMT 142 and the FMT 144 described for FIG. 1. Alternatively, the method 400 may be performed by execution of partition management software as described for FIG. 2.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a plurality of partitions, each partition having its own operating system (OS) and workload;
   a plurality of resources assignable to the plurality of partitions; and
   a processor configured to execute management logic accessible to the plurality of partitions and the plurality of resources,
   wherein the management logic is configured to set priority rules for each of the plurality of partitions based on user input,
   wherein the management logic performs automated resource fault management for the resources assigned to the plurality of partitions based on the priority rules, and
   wherein the priority rules designate a first-level of said partitions, from which resources cannot be unassigned, and second-level of said partitions, from which resources can be unassigned.

2. The system of claim 1 wherein management logic selectively re-assigns resources between two on-line partitions.

3. The system of claim 1 wherein management logic selectively re-assigns resources from an on-line partition to a crashed partition.

4. The system of claim 1 wherein, for at least one of said second-level partitions, the priority rules designate a first resource type that can be unassigned and a second resource type that cannot be unassigned.

5. The system of claim 1 wherein, for at least one of said second-level partitions, the priority rules designate a resource quantity that can be unassigned.

6. The system of claim 1 wherein, for at least one of said second-level partitions, the priority rules designate whether a partition workload can be shut down.

7. The system of claim 1 wherein the priority rules comprise priority update events.

8. The system of claim 7 wherein the priority update events are cyclical.

* * * * *